United States Patent [19]

Hines et al.

[11] Patent Number: 5,197,633
[45] Date of Patent: Mar. 30, 1993

[54] MATERIAL METERING APPARATUS

[75] Inventors: Gordon E. Hines, Ann Arbor, Mich.; Myles K. Jakubowski, Baxter, Tenn.; Patrick D. Hill, Belleville, Mich.

[73] Assignee: Hines Industries, Inc., Ann Arbor, Mich.

[21] Appl. No.: 823,124

[22] Filed: Jan. 21, 1992

[51] Int. Cl.$^5$ .............................................. B67D 5/30
[52] U.S. Cl. ................................ 222/14; 222/52; 222/71; 222/181; 222/639; 83/370; 264/142; 264/148
[58] Field of Search .............. 222/55, 14, 59, 52, 222/71, 77, 80, 639, 642, 181, 146.2, 394; 83/370, 369, 364; 264/138, 141, 142, 143, 145, 148, 163, 211.2

[56] References Cited

U.S. PATENT DOCUMENTS

| | | |
|---|---|---|
| 2,432,659 | 12/1947 | Criswell . |
| 2,920,342 | 1/1960 | Spang et al. ........................... 83/369 |
| 3,130,075 | 4/1964 | Larsh . |
| 3,308,898 | 3/1967 | Allen et al. ........................ 222/55 X |
| 3,996,883 | 12/1976 | Gusarov et al. . |
| 4,083,735 | 4/1978 | Caramanian . |
| 4,226,266 | 10/1980 | Guigan .................................. 141/11 |
| 4,277,431 | 7/1981 | Peller ................................... 264/148 |
| 4,354,622 | 10/1982 | Wood ..................................... 222/55 |
| 4,580,698 | 4/1986 | Ladt et al. ............................... 222/55 |
| 4,645,649 | 2/1987 | Nagao . |
| 4,795,060 | 1/1989 | Albrecht ............................. 222/59 X |
| 4,993,934 | 2/1991 | Groff .................................... 264/148 |
| 5,001,408 | 3/1991 | Kyogoku et al. . |
| 5,024,352 | 6/1991 | Gmür et al. ....................... 222/77 X |
| 5,102,599 | 4/1992 | Shults ............................... 222/80 X |

FOREIGN PATENT DOCUMENTS 53-121274 10/1978 Japan .
63-40829 2/1988 Japan .
847107 7/1981 U.S.S.R. .

Primary Examiner—Andres Kashnikow
Assistant Examiner—Kenneth DeRosa
Attorney, Agent, or Firm—Emch, Schaffer, Schaub & Porcello Co.

[57] ABSTRACT

A material metering apparatus is disclosed which extrudes highly viscous material from an orifice of a known diameter past two fiber optic sensors to initiate and terminate a timing sequence. Knowing the specific gravity of the material, the apparatus uses the timing sequence and known diameter of the orifice to calculate the weight of the material so extruded. The components of the material metering apparatus are removable to facilitate ease of cleaning the variation in the viscous material subject to extrusion.

11 Claims, 4 Drawing Sheets

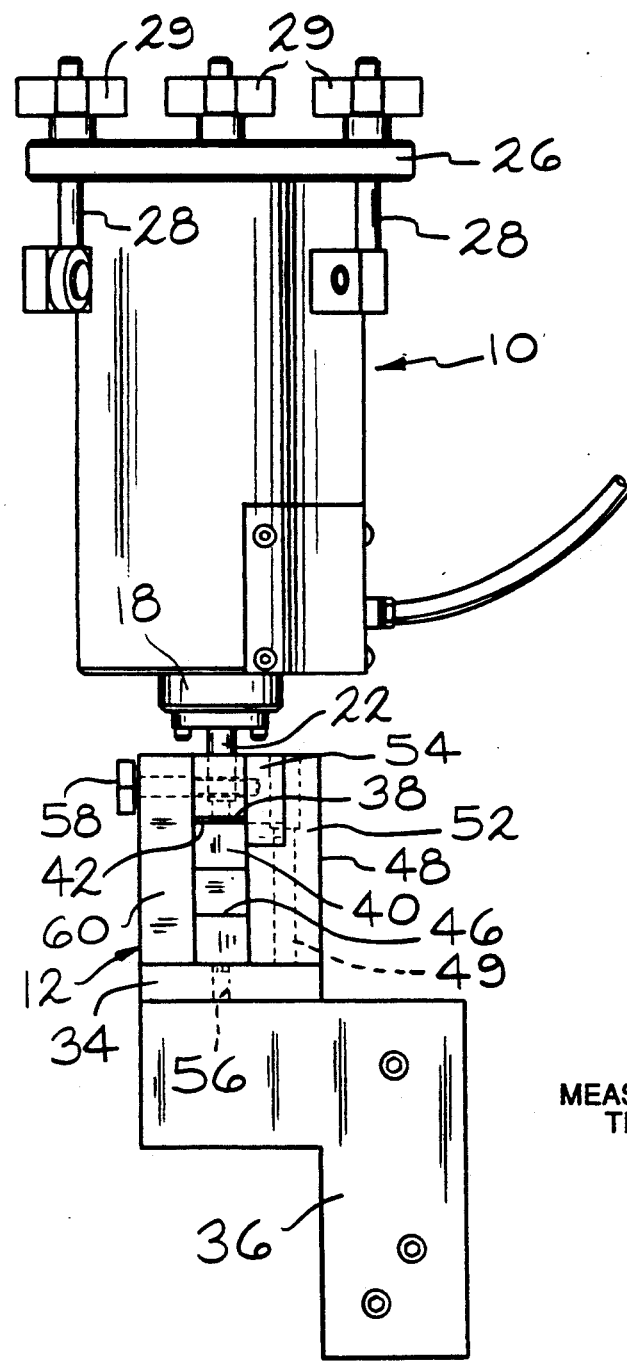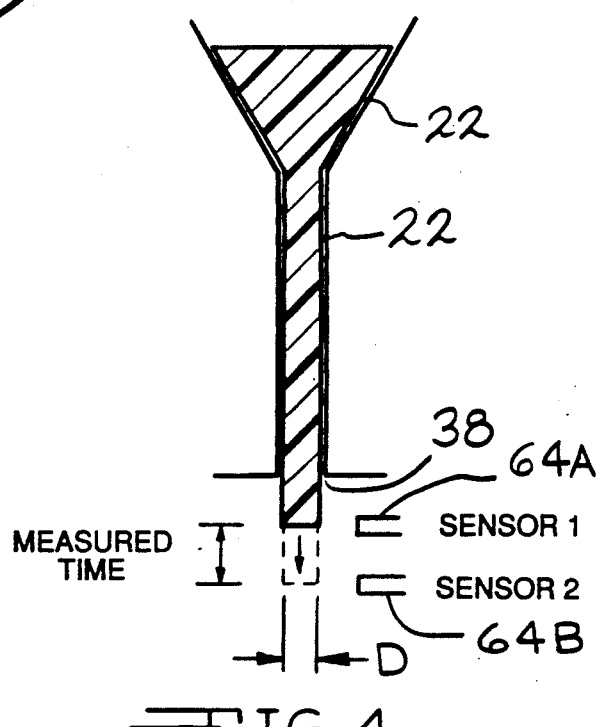
FIG. 3
FIG. 4

MATERIAL METERING APPARATUS

BACKGROUND OF THE INVENTION

The present invention provides an apparatus for metering, and automatically updating the metering by continual monitoring, the actual flow rate of an extruded material. The subject matter of this application is well-suited for use in cooperation with the subject matter of related application Ser. No. 487,069, filed on Mar. 1, 1990 by two of the applicants herein. However, it should be understood that the scope of this invention is not intended to be limited by the disclosures of the '069 application.

Accurate metering of highly viscous substances such as epoxy and putty, in variable amounts, is usually accomplished by one of two known systems: positive displacement ; and, time-based "gate" displacement. It is known that both of these conventional systems have serious drawbacks.

Commonly positive displacement metering systems utilize a material containment chamber of known dimensions, the volume of which can be controlled by means of a piston, driven by a servo or stepper motor. Since the volume of the chamber is fixed, a controlled displacement of the viscous material contained in the chamber will provide the ability to control the amount of material being displaced. Such a positive displacement apparatus usually requires a system of complex valving for properly regulating the fill cycle and the discharge cycle of the material containment chamber. Most positive displacement systems also require a servo controller and many moving components such as the hydraulic, pneumatic or motor driven piston, servo linkages, and control valves. The resultant complexity of design of positive displacement systems therefore create difficulties in controlling the accuracy of the amount of material extruded, especially when the positive displacement device is utilized over long production periods. For instance, if the materials being extruded are highly abrasive in nature, there can be excessive wear on the surfaces which come in contact with the materials being dispensed, such as the chamber, piston and valving. Other problems are encountered when the same positive displacement device is used to dispense a variety of materials in sequential operations. The device must be disassembled and cleaned between each of the dispensing cycles and the disassembly of the complex moving components of the positive displacement device may require extensive down time. A further disadvantage of cleaning such positive displacement devices results from the frequent applications of solvent to flush the positive displacement device and its moving components, which then requires proper disposal. With these disadvantages in mind, efforts have been made to reduce the undesirable complexities of material dispensing systems, thereby leading to the generation of designs of the time based "gate" displacement device.

The time based "gate" displacement device most commonly consists of a pressurized material containment chamber which feeds the viscous material to a material application nozzle. Extrusion of material from the nozzle is controlled by a gate member that opens and closes the nozzle for a predetermined amount of time. The length of time that the gate is opened and closed is usually determined from a pre-test using the viscous material. However, during the course of a long production run, the ability to obtain continued measurable accuracy of the amount of material being dispensed is dependent upon a number of variables which are known to affect the flow rate of the material passing through the nozzle in the predetermined period of time. Some of these variables include the pressure applied to the material containment chamber, the amount of viscous mass the pressure is acting against, the ambient pressure, the temperature of the material, the viscosity of the material, and any other individual factors that may influence the flow rate of a specified material. The influences of these variables on the material extrusion process are variously dependent upon the specified material in use and must, therefore, all be closely monitored and controlled to achieve continued accuracy of extrusion when utilizing the time based "gate" system. As can be imagined, the control and monitoring of these variables creates a system that in itself is difficult to calibrate and can be commonly unstable. Further, since the variables must be compensated for by operator intervention and since the variables do and will change over time, constant operator intervention is required to maintain accurate repeatability in the metering of viscous material flow.

Thus, it is an object of this invention to provide an apparatus for dispensing highly viscous putty, epoxy or other substances in repeatable, accurate amounts.

Another object of the present invention is to provide a dispensing apparatus which eliminates the mechanical complexities of positive displacement devices.

Yet another object of the present invention is to provide a dispensing apparatus which eliminates the inherent instabilities of the time based "gate" devices.

SUMMARY OF THE INVENTION

The present invention provides an apparatus for dispensing, by extrusion, highly viscous putty, epoxy and other substances in accurate and variable amounts. The apparatus of the present invention monitors and automatically updates the actual flow rate of the extruded material during the extrusion process. The apparatus of this invention utilizes two sensors positioned proximate the material extrusion orifice to analyze the flow of the extruded material and provide time and flow data to a microprocessor or computer. As the worm of extruded material initiates a signal at the first sensor the microprocessor or computer begins a timing sequence that is terminated when the extruded worm initiates a signal at the second sensor. The timing sequence is then utilized as a baseline from which the flow rate for the specific material being extruded can be calculated. Therefore, having a fixed orifice diameter and a known specific gravity for the extruded material, an accurate "time versus weight" dispensing cycle is created by the microprocessor.

The apparatus of this invention is calibrated by closing a flow gate, located at the extrusion orifice, upon activation of the second sensor. The extruded portion of material is then removed and weighed and the weight of the material is entered into the microprocessor as the flow rate standard from which time sequences for larger or smaller amounts of material are to be computed. Any changes in the flow rate of material are determined by the sensor at each dispensing cycle. Thus the present invention has the flexibility to vary the length of extrusion time to receive calculated amounts of material, dependent upon the flow rate of the material.

The apparatus of the present invention has many benefits when compared with the commonly known prior art devices. For each type of material to be extruded, the calibration sequence for the device must only be performed one time. Further, since the orifice and the distance between the two sensors are both fixed and the actual flow rate is updated with each extrusion, the variables that commonly influence the flow rate in the time based gate system are rendered immaterial. The metering apparatus of this invention is simple in design in that it has only one moving part, the gate. The device is designed and constructed such that it can be disassembled, cleaned and reassembled without tools in a very short time frame by unskilled personnel. Such ease of cleaning reduces the need to flush the individual components with large quantities of solvents. Finally, the apparatus of this invention is capable of maintaining a repeatability in extrusion weight of 0.020 grams over a large range of variations in pressure, temperature and viscosity. Fine tuning of the gate movement and orifice diameter has shown the capability of producing a 0.005 gram repeatability in the material extrusion weight.

The present invention will be more readily understood after reviewing the following description of the preferred embodiment along with the accompanying drawings.

BRIEF DESCRIPTION OF THE DRAWINGS

FIG. 3 is a front view of the apparatus of FIG. 1;

FIG. 4 is a schematic illustration showing the flow of the extruded material through the extrusion orifice and past the two sensors of the apparatus of FIG. 1.

DETAILED DESCRIPTION OF THE PREFERRED EMBODIMENT

Figure 1:
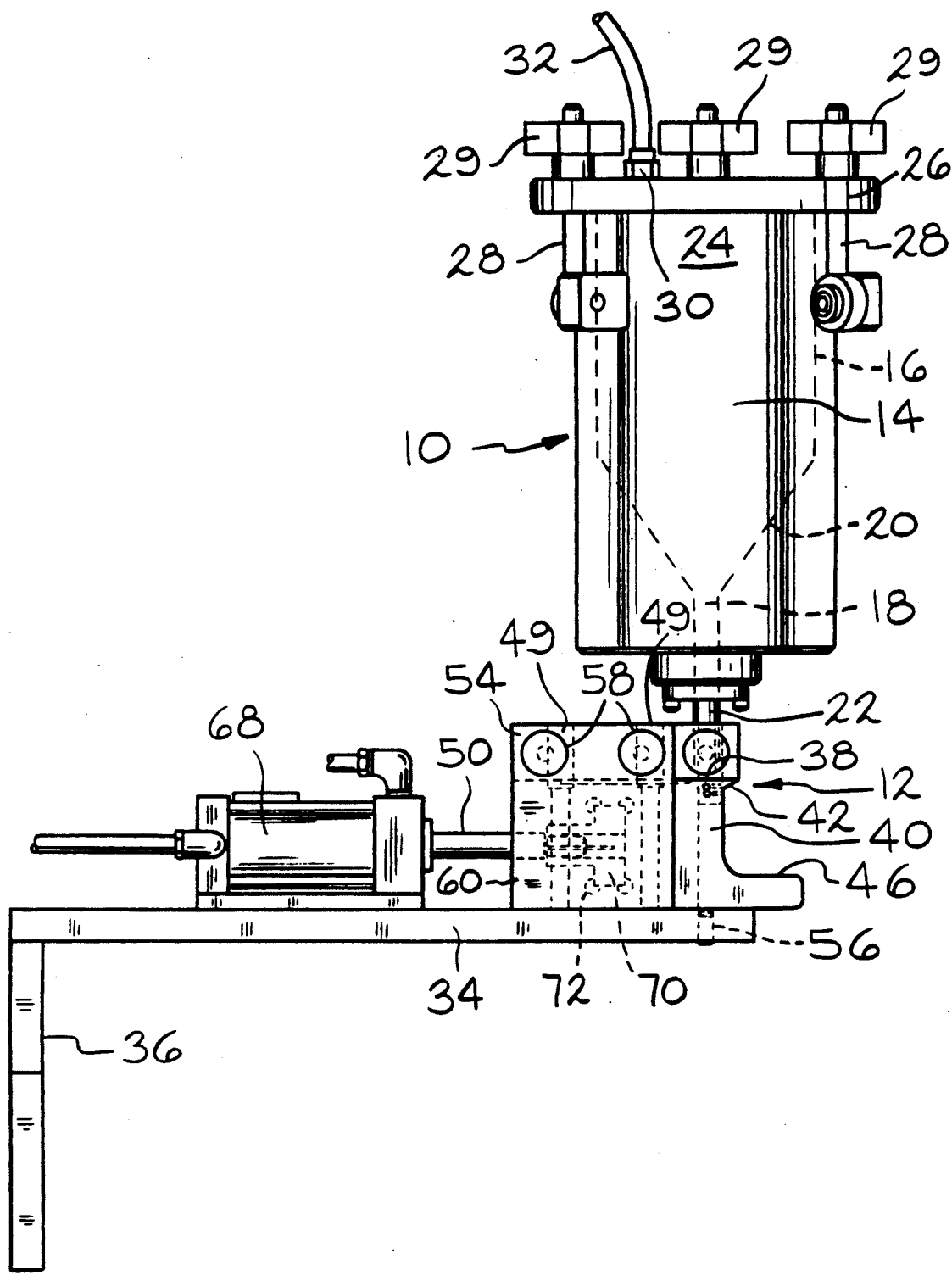
FIG. 1 is an elevated side view of the material metering apparatus of the present invention.

The present invention provides a material metering apparatus intended for use in discharging highly viscous material, the apparatus being generally composed of a tank assembly 10 in combination with a cutter assembly 12, as shown in FIGS. 1-4. The tank assembly 10 includes a material containment chamber 14, of known volume, which is designed to hold the viscous material for dispensing. The exemplary embodiment of this invention utilizes a heating element (not shown) in combination with the material containment chamber 14 to maintain the viscous material at a set temperature, thereby eliminating variations in the specific gravity of the material. A favored temperature is 120° F. Preferably the chamber 14 has smooth cylindrical sidewalls 16 which act to facilitate the clean extrusion of material from the tank assembly 10. One end 18 of the tank assembly 10 provides for a gradual narrowing of the sidewalls 16 of the material containment chamber 14, thereby creating a funnel-like shape 20 which terminates in a nozzle member 22 of predetermined diameter. The nozzle member 22 extends from the tank assembly 10, and engages an orifice 38, of predetermined diameter, D, located in the cutter assembly 12. The opposed end 24 of the tank assembly 10 is open, exposing the interior of the chamber 14, to facilitate loading of the viscous material into the chamber 14. A cap assembly 26, designed to engage and seat on the open end 24 of the tank assembly 10, creates an airtight seal over the material containment chamber 14. The cap assembly 26 includes at least three tie down members 28, shown to be quick release nuts or screws 29 which firmly seat the cap assembly 26 into its enjoined, airtight engagement with the open end 24 of the material containment chamber 14. A pneumatic coupling 30 is located in the cap assembly 26 to which a pneumatic air hose 32 is attached. The pneumatic coupling 30 provides an air inlet for pneumatic pressure received from a pump source (not shown) to be provided to the interior of the material containment chamber 14 to force the extrusion of the viscous material through the nozzle member 22 into the orifice 38.

Figure 2:
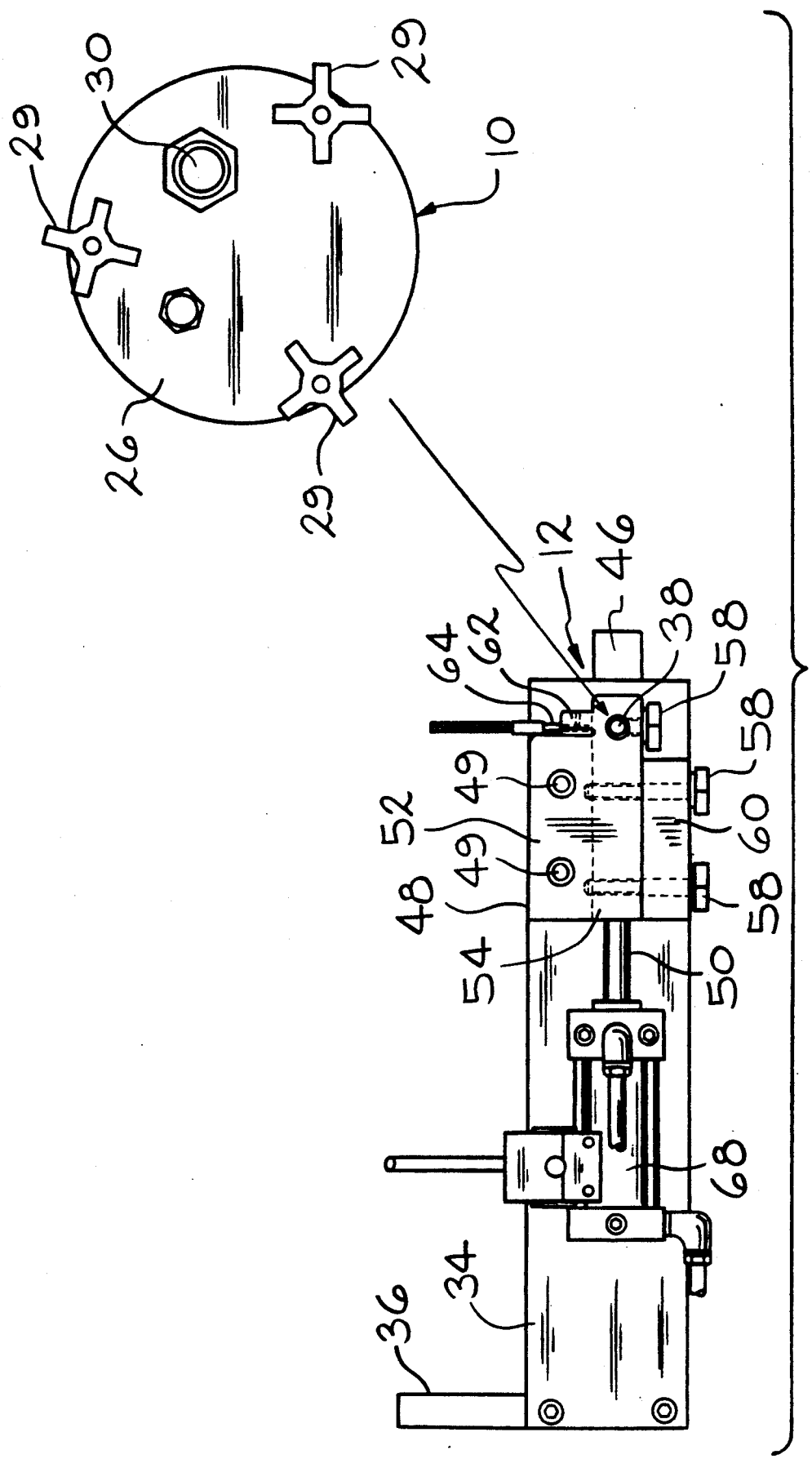
FIG. 2 is a top view of the apparatus of FIG. 1 with the tank assembly removed to the side.
Figure 5:
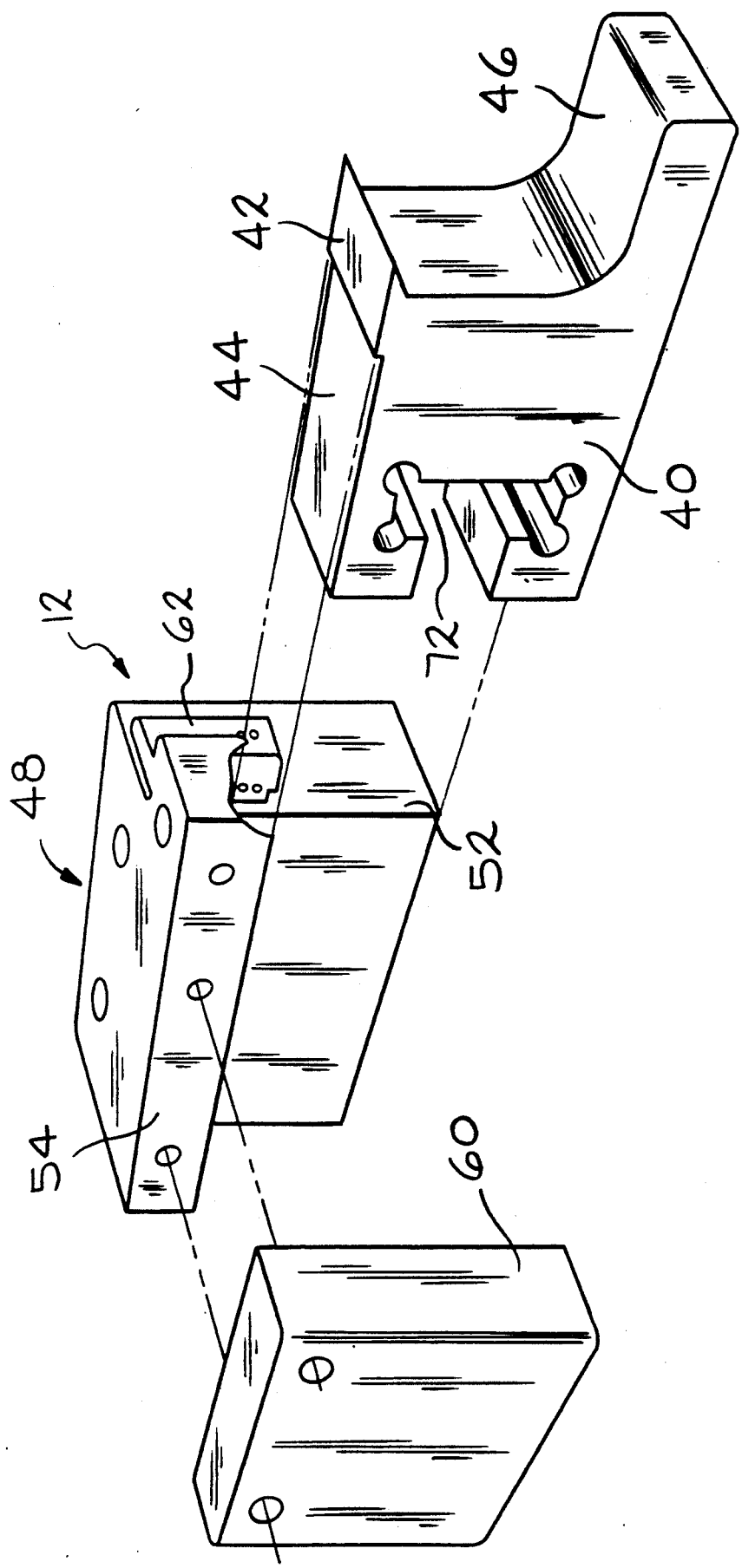
FIG. 5 is a detailed perspective view of the cutter assembly of the apparatus of FIG. 1.

Referring now generally to FIGS. 1-3 and specifically to FIG. 5, the cutter assembly 12 is shown to engage the orifice 38. Action of the cutter assembly 12 will control the discharge or extrusion of the material under pressure from the material containment chamber 14 through the orifice 38. The cutter assembly 12 generally includes a base member 34 positioned on a base support 36 which can be fixed to a foundation (not shown). The cutter assembly 12 includes a cutter member 40 having a shear blade 42, the width of which is at least as wide as the diameter D of the orifice 38. The shear blade 42 of the cutter assembly 12 has a smooth flat upper surface 44 designed to mate flush with the orifice 38, thereby preventing the flow of extruded material from the orifice 38 when the cutter member 40 is in the closed position. A material catch surface 46 is located on the cutter member 40 directly below the shear blade 42 for receiving any extruded material removed from the orifice 38 by the shear blade 42.

The cutter member 40 is supported by the base member 34 and its engagement with the base member 34 is designed for movement with respect to the base member 34 as it is reciprocated through the engagement with a piston member 50 to be described shortly. A first plate member 48, fixed to the base member 34, by sink screws 49 provides a guide means for the cutter member 40, thereby assisting to retain the cutter member 40 in a cooperative position with respect to the orifice 38. The first plate member 48 includes a side wall 52 engaged substantially flush with a side of the cutter member 40 and a top wall 54 engaged substantially flush with the flat upper surface 44 of the shear blade 42. The orifice 38 is located in the top wall 54 of the first plate member 48. In the preferred embodiment, a resilient member 56, such as a spring loaded ball bearing is retained in the base member 34, and is directly opposed to the location of the orifice 38. The resilient member 56 engages the cutter member 40, applying a slight force in the direction of the orifice 38 to maintain the upper surface 44 of the cutter member 40 in its flush engagement with the orifice 38, when the cutter member 40 is in the closed position.

The tank assembly 10 is engaged with the cutter assembly 12 by means of the nozzle member 22 which is positioned in the orifice 38 of the top wall 54. A releasable retaining screw 58 facilitates the fixed retention of the nozzle member 22 in the orifice 38.

A second plate member 60 is positioned in an opposed relationship with the side wall 52 of the first plate member 48 to also engage the cutter member 40. The second plate member 60 is fastened to the top wall 54 of the first plate member 50 by at least two releasable retaining screws 58. Loosening of the retaining screws 58 allows for disassembly of the first and second plate members 48, 60 and the cutter member 40 as shown in FIG. 5 to facilitate cleaning of the cutter assembly 12. Further, the nozzle member 22 may be removed from the orifice 38 to facilitate cleaning the orifice 38 and the tank assembly 10. It is envisioned that a plurality of tank assemblies 10, containing various viscous materials may be kept in storage for use with a single cutter assembly 12. Thus the ease with which the cutter assembly 12 is cleaned provides an enhanced ability to changeover between differing materials.

The first plate member 50 also includes a sensor block 62 which, preferably, retains two proximity sensors 64 spaced a fixed distance apart, preferably fiber optic units. Referring now to FIG. 4, as the viscous material is extruded past the first fiber optic sensor 64A, the microprocessor initiates a timing sequence which continues until the flowing material reaches the second sensor 64B, at which time the timing sequence is terminated. The proximity sensors 64A, 64B are, preferably, positioned immediately below the orifice 38 and are also positioned a fixed distance from each other. An alternative embodiment to this structure envisions the use of a single proximity sensor 64 located a fixed distance from the orifice 38. The design and placement of the sensor 64 or sensors 64A, 64B is dependent upon the type of material being extruded and the orifice 38 diameter D. Certain types of viscous material are known to curl upon exiting the orifice 38, thereby creating inaccuracies in the measurement of the amount of material discharged. Adjustments to the diameter D of the orifice 38 as well as care in designing the placement and proximity of the sensor(s) 64 (64A, 64B) will prevent such inaccuracies from happening. If the sensor(s) 64 (64A, 64B) are positioned in close proximity to the orifice, there is less chance of curling affecting the initiation and termination of the timing sequence. The timing sequence will then be initiated upon opening of the orifice 38 and will continue until the extrusion of material passes the sensor 64.

The cutter member 40 is engaged with a piston member 50 operated by a cylinder assembly 68. The piston member 50 includes a T-block 70 which engages a corresponding T-key 72 located in the cutter member 40. The T-block 70 is designed to be easily disengaged from the cutter member 40 to allow the cutter member to be removed from the assembly 12 and to facilitate the cleaning of the cutter assembly 12. The cylinder assembly 68 is preferably pneumatic but may also be hydraulic, depending upon design. As the cylinder assembly 68 operates it reciprocates the piston 66 and the cutter member 40 reciprocates to open the orifice 38, allowing the pressurized viscous material to flow, and closes the orifice 38, thereby shearing off the viscous material onto the material catch surface 46.

In operation, the apparatus of the present invention performs as follows. Highly viscous material such as a putty-like substance or an epoxy is loaded into the material containment chamber 14 of the tank assembly 10. The chamber 14 is then enclosed by the cap assembly 26 and the tiedown members 28 are tightened to seal the tank assembly 10 in an airtight fashion. The tank assembly 10 is pneumatically pressurized with the cutter member 40 located in its closure position sealing the orifice 38. Once the tank assembly 10 is pressurized, the metering device is calibrated as follows. The pneumatic cylinder assembly 68 is activated to reciprocate the piston member 66 and move the cutter member 40 to open the orifice 38, whereby a worm of the viscous material is extruded under pressure from the material containment chamber 14. As the extruded material passes the first sensor 64A, the computer or microprocessor starts the timing sequence. When the material passes the second sensor 64B, the timing sequence is terminated and the computer calculates the time the material took to travel the fixed distance between the two sensors 64 A,B. The material is weighed and the weight and time measurements are entered into the computer to establish a flow rate for the given material. The computer calculates the flow rate of the material so dispensed based upon (1) the distance between the two sensors which is fixed, (2) the specific gravity of the material which is known, and (3) the diameter of the worm which is fixed at the diameter D of the orifice 38. This calibrated flow rate information is retained in memory for each different material to be dispensed to be used with future operations involving the same material to control the timing of the cutting member 40 closure after the microprocessor calculates the time required to dispense a desired amount of material. In operation, the material will continue to flow until the amount calculated to be proper, based upon the known flow rate calibration of the specific material, is extruded. Once the calculated amount of material is extruded, the computer will activate the pneumatic cylinder 68 to reciprocate the piston member 66 and the cutter member 40 to slide the shear blade 42 back past the orifice 38 to remove the extruded worm of material and seal the orifice 38. At the same time the microprocessor releases the air pressure on the material containment chamber 14. The cutter member 40 will remain in the closed position until another specified amount of extruded material is needed. If the weight of the amount needed by the computer is less than the weight of the amount required to pass in front of both sensors 64A,B, then the computer will average the needed time frame of extrusion based upon the last extrusion flow analyzed. Thus, extremely small amounts of material may also be dispensed by the apparatus of this invention.

The material metering device as described herein has shown a repeatability and desired accuracy for requested material amounts of between 0.02 grams and 10 grams. The accuracy is dependent upon the orifice 38 diameter D. Preferably, the orifice 38 diameter D is 0.250 inches, however, the diameter D may be varied by design to provide specific sizes and shapes of extruded material. A general rule, however, is that the accuracy in weight calculation of the extruded material increases as the diameter D decreases.

The apparatus of this invention is designed to be disassembled without tools for cleaning. The retaining screws 58 are easily removable, allowing removal of the second plate member 60, thereby exposing the cutter member 40 and orifice 38 for cleaning. The orifice 38 engages the nozzle member 22 to form a total path length of approximately 1.5 inches for the material to flow from the material containment chamber 14 to the shear blade 42. The nozzle member 22 is removable from the orifice 38, leaving a relatively short portion to clean. Also, since the shear blade 42 is engaged with the piston member 66 by means of a T-block 70 that can be easily disengaged from the T-key 72 of the cutting member 40 after the second plate member 60 is removed, the cutter member 40 can be removed and cleaned without difficulty. The apparatus of this invention is thus designed to be disassembled, cleaned and reassembled in very little time.

The above noted description of the preferred embodiment of this invention is intended to be instructive in nature and is not intended to be limiting upon the scope and content of the following claims.

We claim:

1. A material metering apparatus comprising, in combination:

a tank assembly having a material containment chamber of known volume and means for pressurizing said material containment chamber;

a cutter assembly in communication with said tank assembly for receiving extruded material of a known specific gravity under pressure from said material containment chamber through an orifice of fixed diameter, said cutter assembly including a shear blade having a mating surface for engaging with and sealing said orifice to prevent the extrusion of such material, means for moving said shear blade out of such engagement position with said orifice, whereby when said shear blade is returned to such position of engagement with said orifice it shears off any material extending from said orifice; and timing means for determining the time it takes such material to travel a preknown distance after extrusion from said orifice, whereby a flow rate for said material is established.

2. The apparatus of claim 1, wherein said moving means includes a reciprocating member engaged with said shear blade, wherein activation of said reciprocating member propels said shear blade into and out of such position of engagement with said orifice.

3. The apparatus of claim 1, wherein said tank assembly includes a heating means for maintaining material contained in said material containment chamber at a constant temperature.

4. The apparatus of claim 1 further including a control means for calculating a flow rate for such material and thereby developing a timing sequence for supplying a desired weight of such material using the information gathered by said timing means and utilizing the known diameter of said orifice and the known specific gravity of such material.

5. The apparatus of claim 4, wherein said control means acts to vary the length of extrusion time necessary to dispense a known weight of such material as a result of comparative timing with past extrusions of such material and resultant variations in the flow rate of such material.

6. The apparatus of claim 4, wherein said control means acts to vary the weight of such material being dispensed by utilizing the flow rate calculated from an immediate past extrusion in combination with such timing sequences.

7. The apparatus of claim 1, wherein said tank assembling is engaged with said orifice by releasable means wherein said tank assembly may be disengaged from said orifice and said shear blade is releasable from engagement with said reciprocating means and said cutter assembly.

8. The apparatus of claim 4, wherein said timing means includes at least one sensor spaced a predetermined distance from said orifice, wherein said control means initiates such timing sequence upon opening of said orifice to begin extrusion of such material and such timing sequence is terminated when said control means receives a signal from said sensor, such signal being triggered by such extrusion of material.

9. The apparatus of claim 4, wherein said timing means includes a first sensor proximate said orifice and a second sensor spaced a specified distance from said first sensor, said first and second sensors in communication with said control means for providing signals to said control means, wherein such signal from said first sensor initiates such timing sequence and such signal from said second sensor terminates such timing sequence.

10. The apparatus of claim 9, wherein said sensors are fiber optic sensors.

11. The apparatus of claim 8, wherein said sensor is a fiber optic sensor.

* * * * *